US011551473B2

(12) United States Patent
Yu et al.

(10) Patent No.: US 11,551,473 B2
(45) Date of Patent: Jan. 10, 2023

(54) GATE MATE COMPRISING DETECTION PASSAGE SYSTEM INTEGRATING TEMPERATURE MEASUREMENT AND FACIAL RECOGNITION

(71) Applicant: Reconova Techonologies Co., Ltd., Xiamen (CN)

(72) Inventors: Haiyang Yu, Xiamen (CN); Donghui Zhan, Xiamen (CN); Jiangqiang Liu, Xiamen (CN); Yutao Han, Xiamen (CN); Zhihui Wen, Xiamen (CN); Baozhi Jia, Xiamen (CN)

(73) Assignee: RECONOVA TECHNOLOGIES CO. LTD., Xiamen (CN)

( * ) Notice: Subject to any disclaimer, the term of this patent is extended or adjusted under 35 U.S.C. 154(b) by 112 days.

(21) Appl. No.: 17/173,271

(22) Filed: Feb. 11, 2021

(65) Prior Publication Data

US 2021/0248353 A1 Aug. 12, 2021

(30) Foreign Application Priority Data

Feb. 11, 2020 (CN) ........................ 202010086294.X

(51) Int. Cl.
*G06V 40/16* (2022.01)
*G01S 7/4865* (2020.01)
(Continued)

(52) U.S. Cl.
CPC ............ *G06V 40/16* (2022.01); *G01S 7/4865* (2013.01); *G08B 3/10* (2013.01); *G08B 21/18* (2013.01)

(58) Field of Classification Search
CPC .... G06V 40/16; G06V 40/166; G06V 10/803; G06V 40/168; G06V 40/172;
(Continued)

(56) References Cited

U.S. PATENT DOCUMENTS 9,720,086 B1 * 8/2017 Skowronek ............. G01S 15/86
2016/0317041 A1 * 11/2016 Porges ................. A61B 5/7235
2018/0239977 A1 * 8/2018 Matsimanis ........... G06V 10/42

OTHER PUBLICATIONS

CN110160671A Body Temperature Device published on Aug. 23, 2019 (Year: 2019).*

(Continued)

*Primary Examiner* — Nimesh Patel
(74) *Attorney, Agent, or Firm* — Calfee, Halter & Griswold LLP

(57) ABSTRACT

The present disclosure relates to thermal temperature measurement and facial recognition and discloses a gate mate comprising a detection passage system integrating temperature measurement and facial recognition, the gate mate comprises a face imaging camera lens, a thermopile sensor, a TOF (time-of-flight) optical ranging lens module, and an environmental temperature compensation module. The face imaging camera lens is used to detect and recognize human face and detect whether a front face of a measured person faces the face imaging camera lens. The thermopile sensor is used to detect a temperature of a forehead of the measured person and an environmental temperature. The TOF optical ranging lens module is used to detect a distance between the human face and the thermopile sensor. The environmental temperature compensation module is used to perform temperature compensation.

6 Claims, 1 Drawing Sheet

(51) Int. Cl.
*G08B 3/10* (2006.01)
*G08B 21/18* (2006.01)

(58) Field of Classification Search
CPC ...... G06V 40/161; G06V 10/48; G06V 20/58; G06V 40/10; G06V 40/45; G06V 40/178; G01S 7/4865; G01S 17/08; G01S 17/86; G01S 13/34; G08B 3/10; G08B 21/18; G08B 21/0208; G06K 9/6289; G01J 5/16; G01J 2005/123; G01K 13/223; G01K 1/20
See application file for complete search history.

(56) References Cited

OTHER PUBLICATIONS

CN111784894—Access control system, published on Oct. 16, 2020 (Year: 2020).*

* cited by examiner

GATE MATE COMPRISING DETECTION PASSAGE SYSTEM INTEGRATING TEMPERATURE MEASUREMENT AND FACIAL RECOGNITION

RELATED APPLICATIONS

This application claims priority to Chinese patent application number 202010086294.X, filed Feb. 11, 2020. Chinese patent application number 202010086294.X is incorporated herein by reference.

FIELD OF THE DISCLOSURE

The present disclosure relates to thermal temperature measurement, face detection, and facial recognition, and in particular relates to a gate mate comprising a detection passage system integrating temperature measurement and facial recognition.

BACKGROUND OF THE DISCLOSURE

With the continuous development of artificial intelligence (AI) in face detection and facial recognition technology, people have higher and higher requirements for intelligent passing equipment. How to pass efficiently, quickly, conveniently, accurately, and safely has become the basic requirement of intelligent passing equipment. The existing intelligent passing equipment based on AI facial recognition can realize basic passing detection but has no temperature measurement function. During the outbreak of the new coronavirus, there is an urgent need to be able to obtain the body temperature of the human body while realizing the pass detection based on the face, so as to achieve effective epidemic prevention and control and to achieve strict match of the body temperature of every passing person. Existing thermal imaging temperature measurement systems are relatively independent temperature measurement devices that do not have face detection and facial recognition functions, cannot automatically match human and body temperature, and must rely on humans. In this way, when a patient with a fever is found, it is impossible to trace back and search based on the face and finally find the person.

The existing techniques does not have a passing detection system that integrates intelligent passing and temperature measurement. When an epidemic occurs, it is impossible to quickly and effectively obtain the person and the person's body temperature information. It can only be matched manually, which increases workload and even makes the task impossible.

BRIEF SUMMARY OF THE DISCLOSURE

In order to solve the technical problems of the existing techniques, the present disclosure provides a detection passage system comprising a gate mate integrating temperature measurement and facial recognition.

A technical solution of the present disclosure is as follows.

A gate mate comprising a detection passage system integrating temperature measurement and facial recognition. The detection passage system comprises a face imaging camera lens, a thermopile sensor, a TOF (time-of-flight) optical ranging lens module, and an environmental temperature compensation module. The face imaging camera lens is used to collect human face image information and detect whether a front face of a measured person faces the face imaging camera lens. When the front face of the measured person faces the face imaging camera lens, the thermopile sensor is used to detect a temperature of a forehead of the measured person and an environmental temperature around a human face of the measured person. The TOF optical ranging lens module is used to detect a distance between the human face and the thermopile sensor. The environmental temperature compensation module is used to perform temperature compensation according to the temperature of the forehead, the distance between the human face and the thermopile sensor, and the environmental temperature to enable a human body temperature of the measured person to be obtained and output.

In a preferred embodiment, the thermopile sensor is a multi-matrix array sensor, and after the environmental temperature and a voltage generated by a thermopile of the thermopile sensor are measured, the temperature of the forehead of the measured person is calculated according to Stefan-Boltzmann law.

In a preferred embodiment, when the front face of the measured person faces the face imaging camera lens, a forehead area of the measured person is larger than a minimum imaging grid coverage of the thermopile sensor within a preset distance range between the human face and the face imaging camera lens.

In a preferred embodiment, the detection passage system comprises a display screen, and the display screen is used to display the human body temperature of the measured person and the human face image information of the measured person.

In a preferred embodiment, the detection passage system comprises a vision processing module, and the vision processing module is used to analyze human body attributes to separate human body skin area of the forehead and to obtain a temperature of the human body skin area detected by the thermopile sensor.

In a preferred embodiment, the detection passage system comprises a storage module, and the storage module is used to store the human face image information and the human body temperature of the measured person.

In a preferred embodiment, the detection passage system comprises a controller. When the human body temperature is higher than a preset temperature value, the controller outputs a not-open command to a gate comprising the detection passage system according to the human body temperature.

In a preferred embodiment, the detection passage system comprises a voice alarm module. An input of the voice alarm module is connected to an output of the controller, and when the human body temperature is higher than the preset temperature value, the controller controls the voice alarm module to issue a voice alarm.

Compared with the existing techniques, the technical solution has the following advantages.

A detection and passage system of a gate mate integrating temperature measurement and facial recognition of the present disclosure provides a face imaging camera lens, a thermopile sensor, a time-of-flight (TOF) optical ranging lens module, and an environmental temperature compensation module. The face imaging camera lens is used to detect and recognize the human face and judge whether a front face of the measured person is facing the gate mate. When the front face of the measured person is facing the gate mate, the thermopile sensor detects the temperature of a forehead of the measured person and an environmental temperature around the human face. The TOF optical ranging lens module is used to detect the distance between the human face and the thermopile sensor. The environmental temperature compensation module is used to perform temperature compensation according to the temperature of the forehead, the distance between the human face and the thermopile sensor, and the environmental temperature, and a human body temperature of the measured person is obtained and is output as a result. Therefore, when the facial recognition is performed, an accurate temperature measurement of the measured person is carried out to effectively control the passage.

DETAILED DESCRIPTION OF THE EMBODIMENTS

In order to clarify the objective, the technique solution, and the advantage of the present disclosure, the present disclosure will be further described below in combination with the accompanying drawings and embodiments. It should be understood that the embodiments described herein are merely used to explain the present disclosure, and the present disclosure is not limited thereto.

Figure 1:
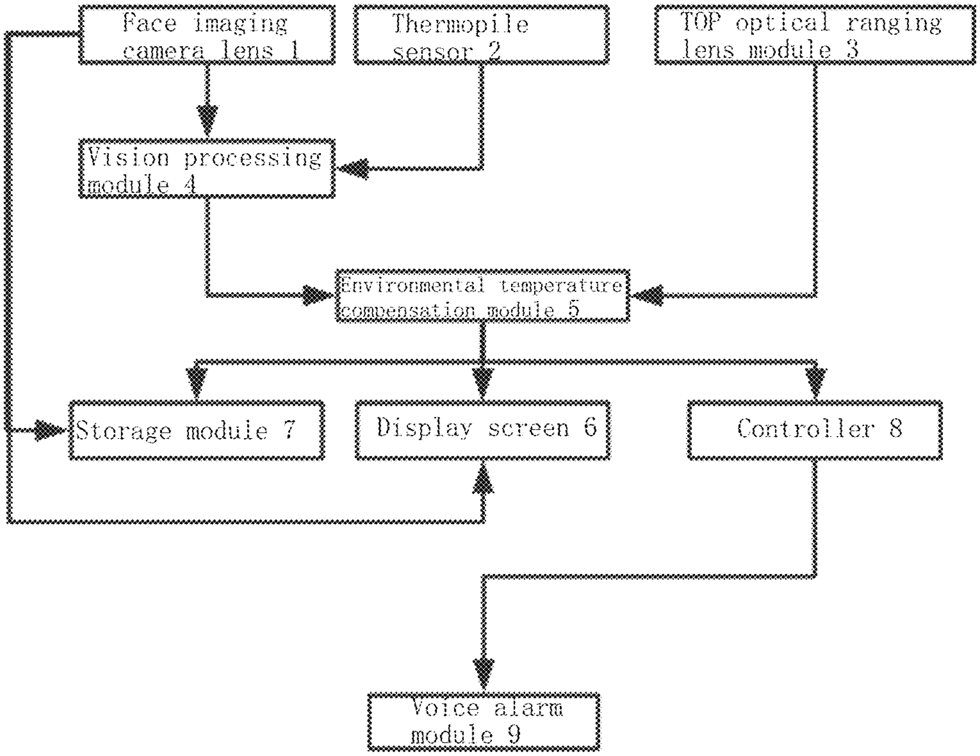
FIG. 1 illustrates a component block diagram of a detection passage system of a gate mate integrating temperature detecting and facial recognition of the present disclosure.
Figure 2:
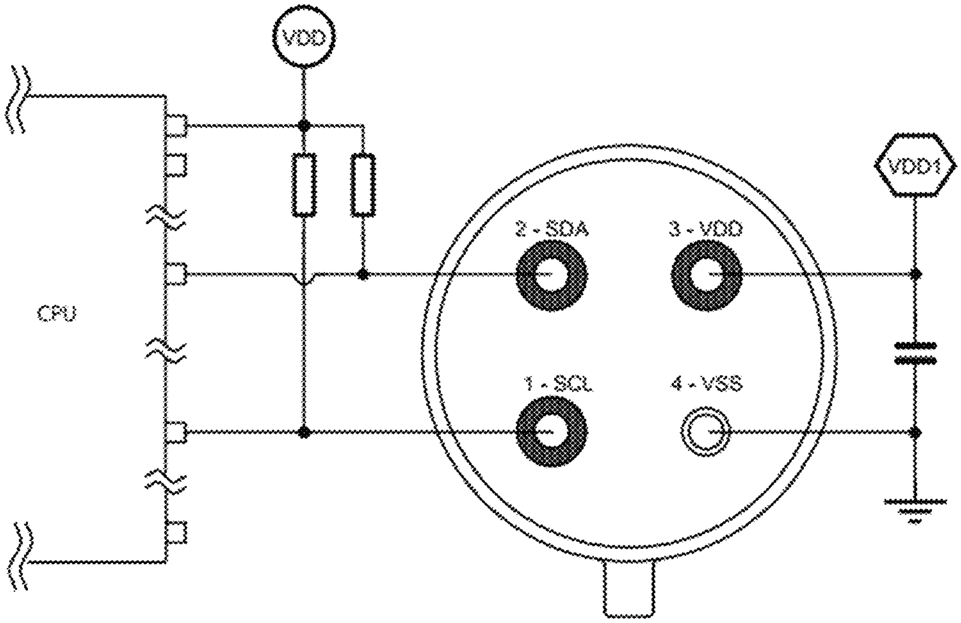
FIG. 2 illustrates a circuit diagram of a thermopile sensor of the present disclosure.

Referring to FIGS. 1 and 2, the present disclosure provides a gate mate comprising a detection passage system integrating temperature detecting and facial recognition. The detection passage system comprises a face imaging camera lens 1, a thermopile sensor 2, a time-of-flight (TOF) optical ranging lens module 3, an environmental temperature compensation module 5, a display screen 6, a vision processing module 4, a storage module 7, a controller 8, and a voice alarm module 9.

The face imaging camera lens 1 is used to collect human face image information and detect whether a measured person faces the face imaging camera lens 1.

When a front face of the measured person faces the face imaging camera lens 1, the thermopile sensor 2 is used to detect a forehead temperature of the measured person and an environmental temperature around a human face of the measured person. The thermopile sensor 2 is a multi-matrix array sensor. After the environment temperature and a voltage generated by a thermopile of the thermopile sensor 2 are measured, a temperature of a measured object is calculated according to the Stefan-Boltzmann law to accurately measure a temperature of each rectangular grid of the multi-matrix array sensor. Frequent calibrations according to specific temperature requirements are not needed. When the thermopile sensor 2 is assembled to the gate mate, the thermopile sensor 2 cooperates with the face imaging camera lens 1 through angle adaptation. A forehead area of the measured person is larger than a minimum imaging grid coverage of the thermopile sensor 2 within a preset distance range between the human face and the face imaging camera lens 1. Therefore, the forehead temperature is effectively detected and calibrated, and a detection accuracy within a temperature range of a human body is ensured.

The TOF optical ranging lens module 3 is used to detect a distance between the human face and the thermopile sensor 2. In TOF technology, continuous infrared light pulses within specific wavelengths are emitted toward the measured object. A light signal (i.e., the continuous infrared light pulses) from the measured object is then received by a specific sensor, and a flight time or a phase difference of light (i.e., the light signal or the continuous infrared light pulses) is calculated to obtain depth information of the measured object. In some embodiments, after a TOF sensor is used, an infrared laser array is used to emit laser pulses. The laser pulses are reflected from a target object in front of the laser pulses and then reflected back to the TOF sensor. In this way, a duration between when the laser pulses are emitted and when the laser pulses return to the TOF sensor is calculated, and a distance between the target object and the TOF sensor can be measured. When the human face is detected, the TOF optical ranging lens module 3 uses TOF ranging technology to immediately calculate a distance by which the human face is separated from the thermopile sensor 2 to perform temperature compensation. As a temperature measurement value of the TOF sensor is linearly related to the distance, when different people pass through, an issue caused due to different people passing by the gate mate at different distances can be effectively avoided due to distance-based compensation.

The environmental temperature compensation module 5 is used to perform temperature compensation according to the temperature of the forehead, the distance between the human face and the thermopile sensor 2, a coverage of the human face (i.e., the forehead) in a grid coverage of the thermopile sensor 2 and the environment temperature to enable a human body temperature of the measured person to be obtained and output. The environmental temperature compensation module 5 is based on a deep learning environment temperature compensation algorithm. Under different environmental temperatures, a temperature of a human body surface will be different. Sometimes, a measurement accuracy will also be affected when the measured person is wearing a hat or glasses. The thermopile sensor 2 is configured to obtain the temperature of the human face (i.e., the forehead) and the environment temperature around the human face. Temperature data of a large number of different people in different scenarios (such as different environmental temperatures, wearing hats, wearing glasses, etc.) is collected, an inherent correlation characteristics of each scenario and a temperature change of the thermopile is analyzed, and a mapping relationship between the scenario and the temperature change of the thermopile $f: X \rightarrow \Delta T$ is fitted ($X \subseteq R^n$, wherein R is a real number set, AT is the temperature change of the thermopile in different scenarios, X are different scenario elements, and n is the number of scenario elements). Therefore, the obtained temperature can be intelligently compensated, and finally a fast and accurate temperature measurement within ±0.1 degree is achieved.

The display screen 6 is used to display the human body temperature of the measured person and a human face image (i.e., the human face image corresponding to the human face image information) of the measured person. The display screen 6 of this embodiment is a liquid crystal display screen.

The vision processing module 4 is used to analyze human body attributes to recognize basic information comprising, for example, hats, glasses, masks, etc. based on a computer vision technology, and a human skin area is separated by identifying the aforementioned area and the human body skin area of the forehead. Therefore, temperature data of the human body skin area detected by the thermopile sensor 2 is obtained.

The storage module 7 is used to store the human face image information and the corresponding human body temperature of the measured person.

When the human body temperature is higher than a preset temperature value, even in a situation where facial recognition of the measured person is successful, the controller 8 will output a not-open command to a gate according to the human body temperature. The gate will not open to effectively control passage.

An input of the voice alarm module 9 is connected to an output of the controller 8. When the human body temperature is higher than the preset temperature value, the controller 8 controls the voice alarm module 9 to issue a voice alarm.

The detection passage system comprising the gate mate integrating temperature detecting and facial recognition of the present disclosure is based on the aforementioned gate mate. When a person approaches, a human face can be immediately detected and starts to be recognized. At the same time, the thermopile sensor 2 detects the temperature of the forehead, the temperature difference generated by the distance is compensated based on the TOF distance measurement, and a final individual body temperature is compensated based on the environmental temperature compensation algorithm. A final result is simultaneously displayed on the display screen 6. After the recognition is successful, the human body temperature and a human facial recognition result are recorded and saved together. If the user configures a fever alarm, a voice alarm is configured to be carried out according to the configuration. Even in case the human facial recognition is successful, the gate will not be opened for passage to effectively prohibit the passage when the measured human has a temperature that exceeds the preset temperature value.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A gate mate comprising a detection passage system integrating temperature measurement and facial recognition, the detection passage system comprising:

a face imaging camera lens, a thermopile sensor, a TOF (time-of-flight) optical ranging lens module a memory which stores computer-readable instructions thereon, and a processor, wherein:

the face imaging camera lens is used to collect human face image information and detect whether a front face of a measured person faces the face imaging camera lens, when the front face of the measured person faces the face imaging camera lens, the thermopile sensor is used to detect a temperature of a forehead of the measured person and an environmental temperature around a human face of the measured person, the TOF optical ranging lens module is used to detect a distance between the human face and the thermopile sensor, and the processor, when executing the computer-readable instructions, performs temperature compensation according to the temperature of the forehead, the distance between the human face and the thermopile sensor, and the environmental temperature to enable a human body temperature of the measured person to be obtained and output;

wherein the detection passage system further comprises a controller and a voice alarm, when the human body temperature is higher than a preset temperature value, the controller outputs a not-open command to a gate comprising the detection passage system according to the human body temperature, an input of the voice alarm is connected to an output of the controller, and when the human body temperature is higher than the preset temperature value, the controller controls the voice alarm to issue a voice alarm.

2. The gate mate comprising the detection passage system integrating temperature measurement and facial recognition according to claim 1, wherein:

the thermopile sensor is a multi-matrix array sensor, and after the environmental temperature and a voltage generated by a thermopile of the thermopile sensor are measured, the temperature of the forehead of the measured person is calculated according to Stefan-Boltzmann law.

3. The gate mate comprising the detection passage system integrating temperature measurement and facial recognition according to claim 1, wherein:

when the front face of the measured person faces the face imaging camera lens, a forehead area of the measured person is larger than a minimum imaging grid coverage of the thermopile sensor within a preset distance range between the human face and the face imaging camera lens.

4. The gate mate comprising the detection passage system integrating temperature measurement and facial recognition according to claim 1, the detection passage system comprising:

a display screen, wherein the display screen is used to display the human body temperature of the measured person and a human face image of the measured person corresponding to the human face image information.

5. The gate mate comprising the detection passage system integrating temperature measurement and facial recognition according to claim 1, wherein the processor, when executing the computer-readable instructions, analyzes human body attributes to separate human body skin area of the forehead and to obtain a temperature of the human body skin area detected by the thermopile sensor.

6. The gate mate comprising the detection passage system integrating temperature measurement and facial recognition according to claim 1, the detection passage system comprising:

a storage, wherein the storage is used to store the human face image information and the human body temperature of the measured person.

* * * * *